United States Patent [19]

Fleming et al.

[11] Patent Number: 4,925,071
[45] Date of Patent: May 15, 1990

[54] FRUIT PICKER'S BAG

[75] Inventors: Jerry A. Fleming, 1011 N. Western, Wenatchee, Wash. 98801; Ronald W. Lytle, East Wenatchee, Wash.

[73] Assignee: Jerry A. Fleming, Wenatchee, Wash.

[21] Appl. No.: 316,086

[22] Filed: Feb. 27, 1989

[51] Int. Cl.⁵ ............................................. A01D 46/22
[52] U.S. Cl. ..................................... 224/207; 224/210; 224/236; 224/272
[58] Field of Search ............... 224/209, 210, 252, 257, 224/259, 261, 268, 271, 272, 202, 207, 236, 216, 251; 248/99, 100, 101, 97, 95; 383/12, 41, 67, 23, 33, 905; 56/328.1, 329, 202, 205; 141/314, 391, 390, 316; 220/401, 404; 24/265 H, 545, 563, 599

[56] References Cited

U.S. PATENT DOCUMENTS

| | | | |
|---|---|---|---|
| 306,863 | 10/1884 | Robinson | 383/33 |
| 719,810 | 2/1903 | Jones | 383/41 |
| 824,160 | 6/1906 | Utterback. | |
| 986,573 | 3/1911 | Jackson. | |
| 1,137,303 | 4/1915 | Carpenter | 224/209 |
| 1,354,220 | 9/1920 | Sharrard | 224/209 |
| 1,394,197 | 10/1921 | Keeline. | |
| 1,459,599 | 6/1923 | Minor | 383/33 |
| 1,548,986 | 8/1925 | Donovan. | |
| 1,645,360 | 10/1927 | Taylor | 224/205 |
| 1,700,686 | 1/1929 | Myers. | |
| 1,992,369 | 2/1935 | Grabill | 150/2 |
| 1,994,362 | 3/1935 | Kavanagh | 224/205 |
| 2,236,199 | 3/1944 | Petersen | 383/67 |
| 3,948,436 | 4/1976 | Bambara | 229/55 |
| 4,548,372 | 10/1985 | Lutzker | 248/99 |
| 4,693,064 | 9/1987 | Katayama | 56/202 |

Primary Examiner—Renee S. Luebke
Attorney, Agent, or Firm—Glenn D. Bellamy

[57] ABSTRACT

This invention provides a fruit picker's bag (10) including a support frame (20) having a top hoop with a rear section (22) with opposite ends, a strap eye (16, 18) at each of the ends, a forward section (24) extending from one end of the rear section (22) over to the opposite end which together with the rear section (22) defines a hoop opening, and brace portion (26) which extends generally vertically downwardly from the rear section (22). A fruit-receiving bag body (30) is detachably connected to the support frame (20). The bag has upper and lower ends and a rear wall portion (36) which includes a pocket (34) at the upper end for receiving the brace portion (26) of the support frame (20). A forward wall portion (40) includes a hook strip (38) connected at the upper end. The hook strip (38) includes a downwardly opening hook channel (50) which is hookable onto the forward section (24) of the top hoop. A carrying harness (14) includes a strap which extends through each of the strap eyes (16, 18). The carrying harness serves to support the fruit picker's bag (10) on a person (12) with the top hoop of the support frame (20) in a substantially horizontal plane and the brace portion (26) of the support frame (20) against a midsection of the person (12). The bag body (30) may also be padded with a resilient padding material (66) to prevent damage to picked fruit.

19 Claims, 4 Drawing Sheets

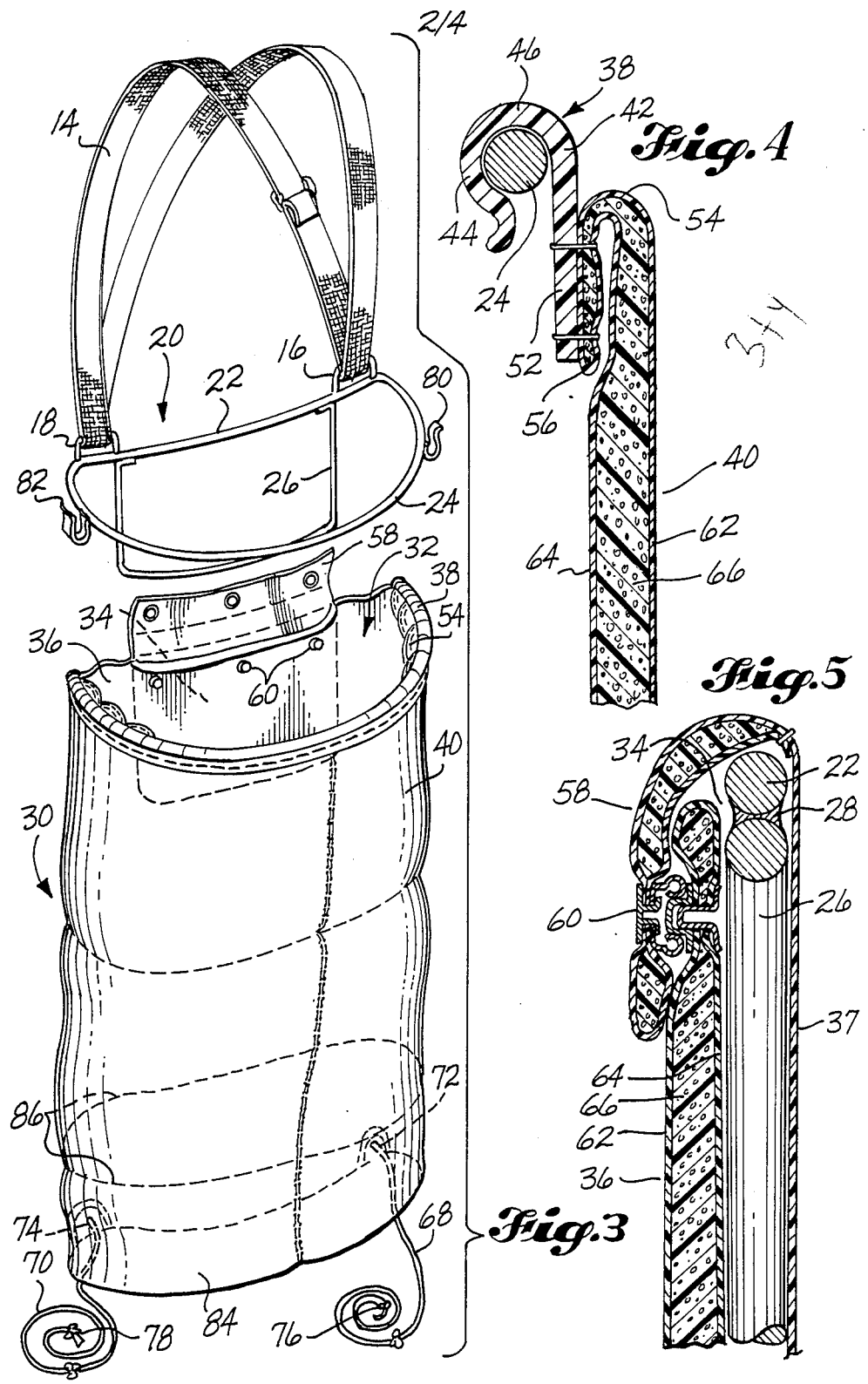

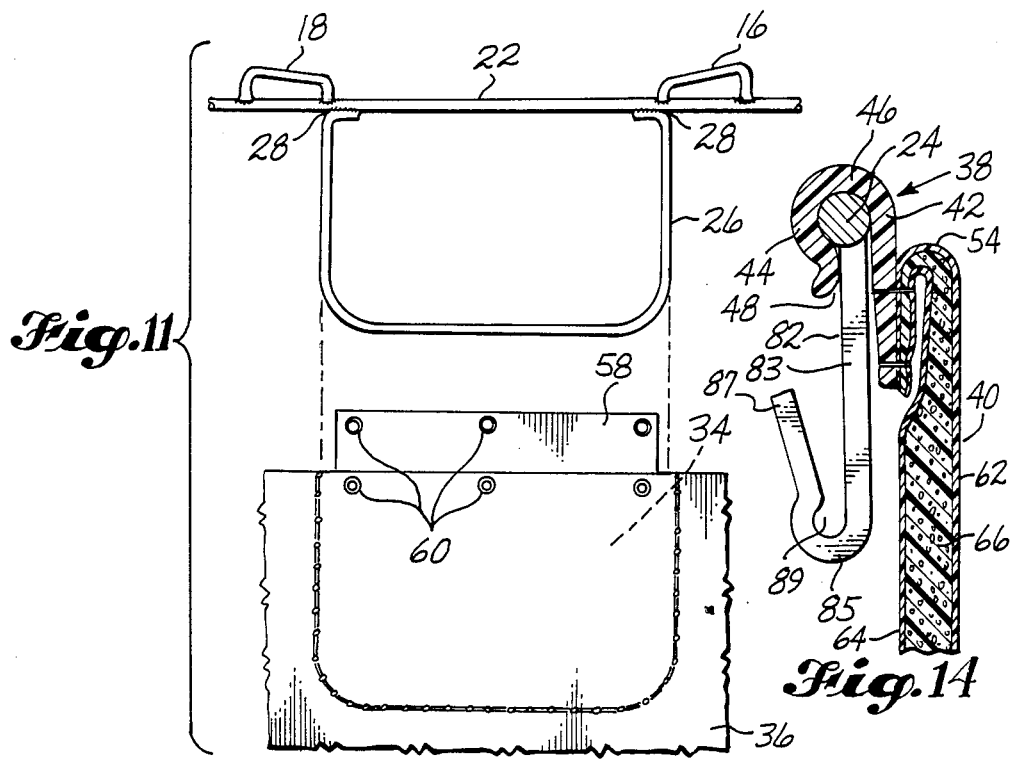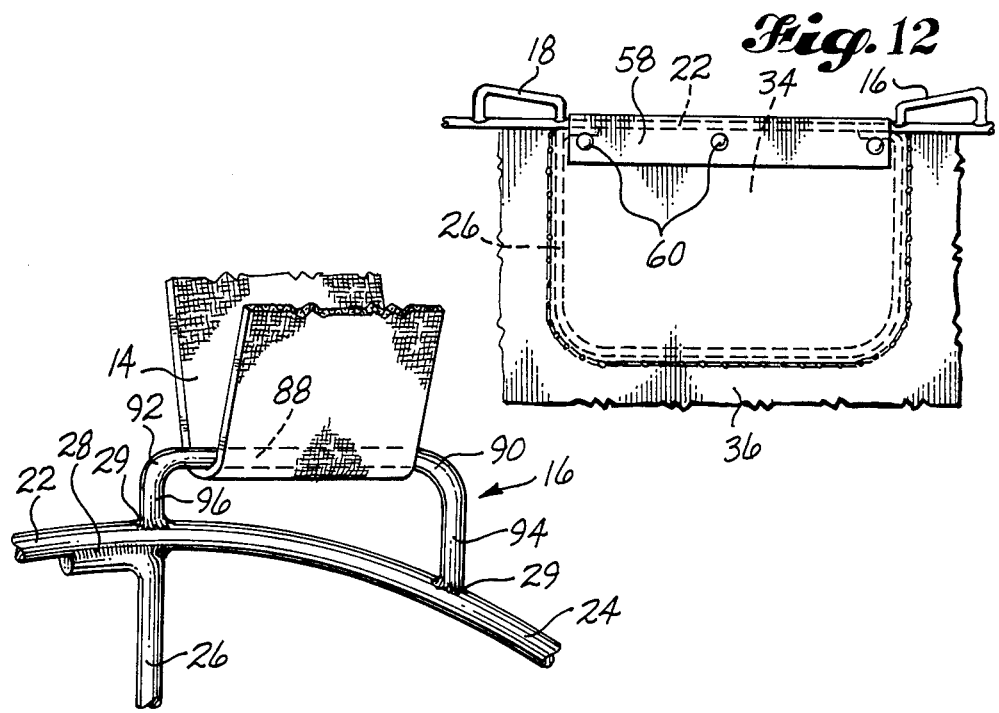

FRUIT PICKER'S BAG

TECHNICAL FIELD

This invention relates to bags for picking and gathering fruit and, in particular, to such a bag having a detachable frame for supporting and maintaining the mouth of the bag in an open position and to providing a padded bag body for protection of harvested fruit against bruising.

BACKGROUND ART

Tree-grown fruits, such as apples or pears, are normally harvested by hand. Orchard workers usually wear picking bags made of canvas slung over their shoulders with a harness and supported by a wire frame at the upper opening. Such bags usually have an open bottom which may be folded up and secured to contain the picked fruit, and which may be released to allow the fruit to roll out the open bottom of the bag into a collection bin. Bags of this type are shown generally in U.S. Pat. No. 1,137,303, issued Apr. 27, 1915, to C. A. Carpenter; U.S. Pat. No. 1,354,220, issued Sept. 28, 1920, to A. W. Sharrard; U.S. Pat. No. 1,394,197, issued Oct. 18, 1921, to W. F. Keeline; and U.S. Pat. No. 1,992,369, issued Feb. 26, 1935, to J. D. Grabill.

Each of the above-identified patents discloses an open top bad supported by a generally D-shaped frame. The straight or slightly concave portion of the frame is positioned against the picker's body and the outer or convex portion of the frame extends generally outwardly to maintain the mouth of the bag in an open position.

The Sharrard patent shows a support frame having a downwardly extending rear portion to assist in maintaining the open mouth of the bag in a generally horizontal position. In picking bags of this type, the bag portion is generally made of cotton canvas and sewn to a wire frame. The attachment of the bag around the frame is commonly covered with leather for reinforcement. Such bags have been substantially unchanged in design over the past several decades.

Typically the top hoop portion of the support frame and the downwardly extending rear portion of the support frame are made of heavy gauge wire with welded joints. These joints are susceptible to breaking when the worker uses the support frame to brace himself against a ladder or leans upon it to rest himself. Because the bags are permanently sewn to the support frame, broken frames cannot be repaired and the entire picking bag becomes useless. Likewise, if the canvas bag is damaged or destroyed, the frame cannot be reused and the entire unit must be replaced.

The current market in the fruit industry requires that each piece of fruit be completely bruise-free. Fruit that is even slightly bruised or blemished is worth only a fraction of that which is perfect in appearance. Most bruising of fruit occurs in the orchard as it is being picked. It is important that nothing in the picking bag contribute to fruit damage. As it is picked, each piece of fruit is carefully laid in the bag. However, as the bag becomes full, it is likely that the bag will be pressed against a rung or siderail of the ladder as the worker attempts to reach the last pieces of fruit. As the worker descends the ladder, the full bag is subjected to impact with the ladder and the worker's knees. Also, as the bag is lifted over the edge of the collection bin, the full bag of fruit is likely to be bumped against the side or edge of the bin. Each of these impacts, however slight, is likely to bruise one or more pieces of fruit. The typical canvas bag offers no protection from such impacts.

Typical fruit-picking bags are slung over the worker's shoulders with webbed belting which passes through eyes in the support frame. Because the bags are sewn to the frame, the eyes of the frame must be positioned to permit a continuously stitched seam. The result is that the position of the eyes typically creates uneven stress on the webbed belting which results in premature wear on the harness.

DISCLOSURE OF THE INVENTION

The present invention provides a fruit picker's bag including a support frame, a fruit-receiving bag, and a carrying harness. The support frame has a top hoop including a rear section with opposite ends, a strap eye at each of the ends, a forward section extending from one end of the rear section over to the opposite end which with the rear section defines a hoop opening, and a brace portion extending generally vertically downwardly from the rear section. The fruit-receiving bag has upper and lower ends. A rear wall portion includes a pocket at the upper end of the bag for receiving the brace portion of the support frame. A hook strip is connected to a forward wall portion at the upper end of the bag. The hook strip includes a downwardly opening hook channel which is hookable onto the forward section of the top hoop. The carrying harness includes a strap which extends through the strap eyes and which serves to support the fruit picker's bag on a person with the top hoop of the support frame in a substantially horizontal plane and with the brace portion of the support frame against a midsection of the person.

The present invention also provides a fruit picker's bag including a support frame similar to that described above and a fruit-receiving bag with padded rear and forward wall portions. The padded bag may also include a lower, unpadded tail portion which is relatively flaccid compared to the padded wall portion. A hinging fold line occurs between the padded wall portion and unpadded tail portion of the bag so that the tail portion may be folded upwardly to close the lower end of the bag.

The present invention may also include strap eyes on the support frame, each of which includes a top member which slopes downwardly from an outer end to an inner end. The harness straps contact the top members and extend upwardly from the strap eyes. Due to the slope of the top member, the harness straps converge as they extend upwardly.

Other aspects and advantages of this invention will be apparent from the detailed description of the best mode of the invention, the drawings, and the appended claims.

BRIEF DESCRIPTION OF THE DRAWING

FIG. 3 is an exploded pictorial view of the fruit picker bag shown by FIGS. 1 and 2;

FIG. 4 is an enlarged scale fragmentary sectional view taken substantially along line 4—4 of FIG. 2, such view showing a hook strip at the upper end of the bag hooked over a forward frame member, and further showing the manner of attachment of the hook strip to the bag and the padded construction of the bag wall;

FIG. 5 is an enlarged scale fragmentary sectional view taken substantially along line 5—5 of FIG. 2, showing the manner of attachment of the rear wall of the bag to a rear portion of the bag supporting frame;

FIG. 11 is an exploded elevational view of a brace portion of the bag supporting frame spaced relative to a receiving pocket formed in an upper rear wall portion of the bag, such view showing a flap closure for the pocket in an up position;

FIG. 12 is a view like FIG. 10, but showing the brace portion within the pocket and the flap closure bent over the rear section of the bag supporting frame and snap fastened to the bag, for securing the bag to the frame; and FIG. 13 is a fragmentary pictorial view of the bag supporting frame in the region of a strap eye; and FIG. 14 is a fragmentary cross-sectional view taken substantially along line 14—14 of FIG. 2.

BEST MODE FOR CARRYING OUT THE INVENTION

Figures 1, 2:
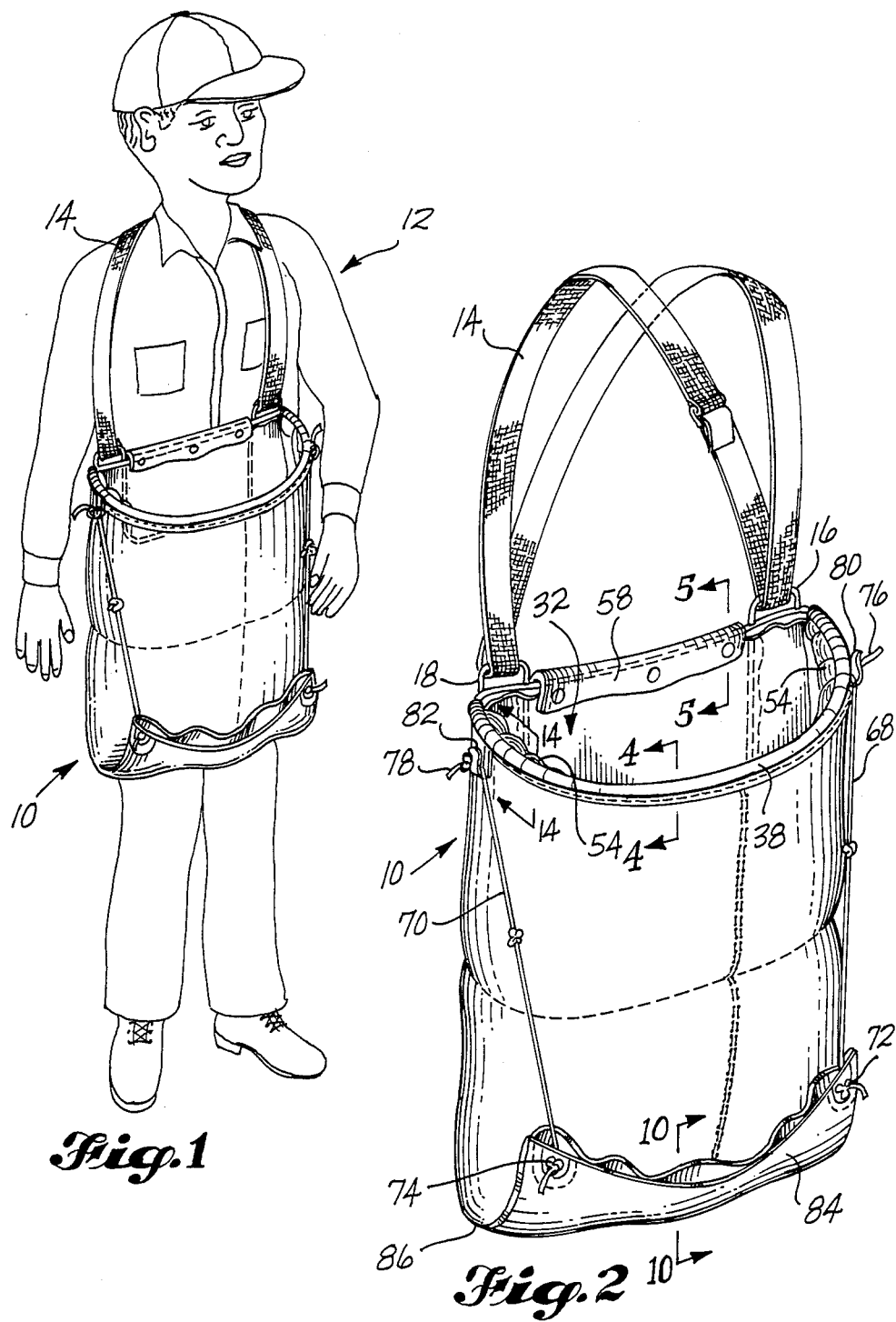
FIG. 1 is a pictorial view of a fruit pickers bag constructed according to the present invention, showing the bag in an operative position relative to a user.
FIG. 2 is an enlarged scale pictorial view of the fruit picker bag shown by FIG. 1.
Figure 6:
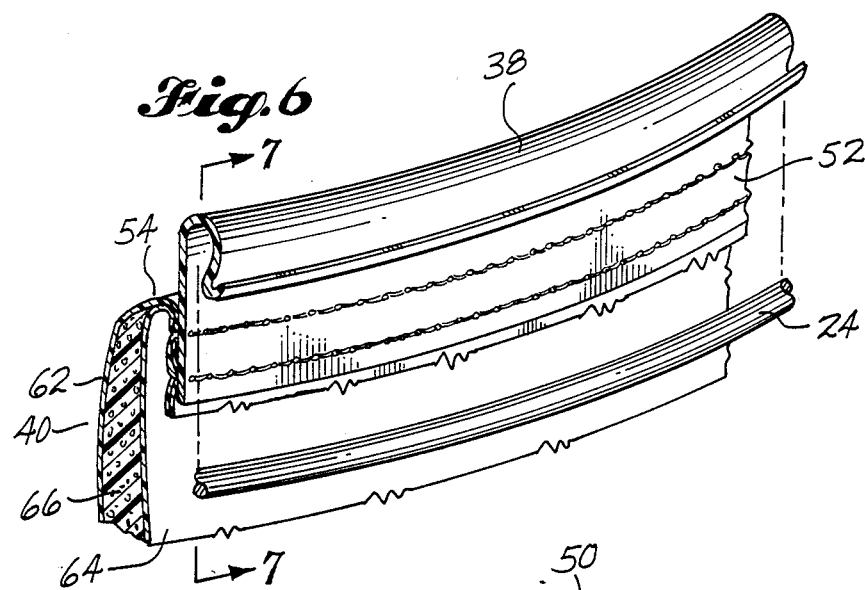
FIG. 6 is an enlarged scale fragmentary view of a portion of the hook strip in an exploded position relative to the front section of the bag supporting frame.

Referring to the accompanying drawing, and first to FIG. 1, therein is shown at 10 the preferred embodiment of a fruit picker's bag in position on a worker 12. Referring also to FIGS. 2 and 3, therein is shown in an enlarged and exploded view the fruit picker's bag 10 which may be slung by way of a harness 14 over the shoulders of a worker 12. The harness 14 passes through strap eyes 16, 18 which are attached to the bag support frame 20. The support frame 20 includes a rear section 22 and a forward section 24. The rear section 22 is relatively straight or, typically, slightly concave to generally conform with the contour of a worker's body. Strap eyes 16, 18 are attached at each end of the rear section 22. The rear and forward sections 22, 24 together define a hoop opening to support the upper end of the picking bag in an open position. Extending generally vertically downwardly from the rear section 22 is a brace portion 26. The brace portion 26 serves to bear against the midsection of the worker's body to support the top hoop in a generally horizontal position outwardly from the worker's body. In preferred form, the entire support frame 20 is made of heavy gauge steel wire approximately ¼-inch in diameter. The brace portion 26 is rigidly attached by welding 28 to the rear section 22 of the support frame 20. The strap eyes 16, 18 are also preferably welded 29 to the top hoop. Support frames of the type generally described above are well known for use with fruit-picking bags. However, such a frame has previously been permanently integrated into the bag body by having the bag permanently sewn onto the frame.

The bag body 30 has an open upper end 32 for receiving fruit. A pocket 34 is formed at the upper end in a rear wall portion 36 by the attachment of a second layer 37 of material. The pocket 34 is sized to receive the brace portion 26 of the support frame 20. A hook strip 38 is connected to a forward wall portion 40 of the bag 30 at the upper edge. The hook strip 38 includes a downwardly opening hook channel which is hookable onto the forward section 24 of the support frame 20.

Figures 7, 8, 9:
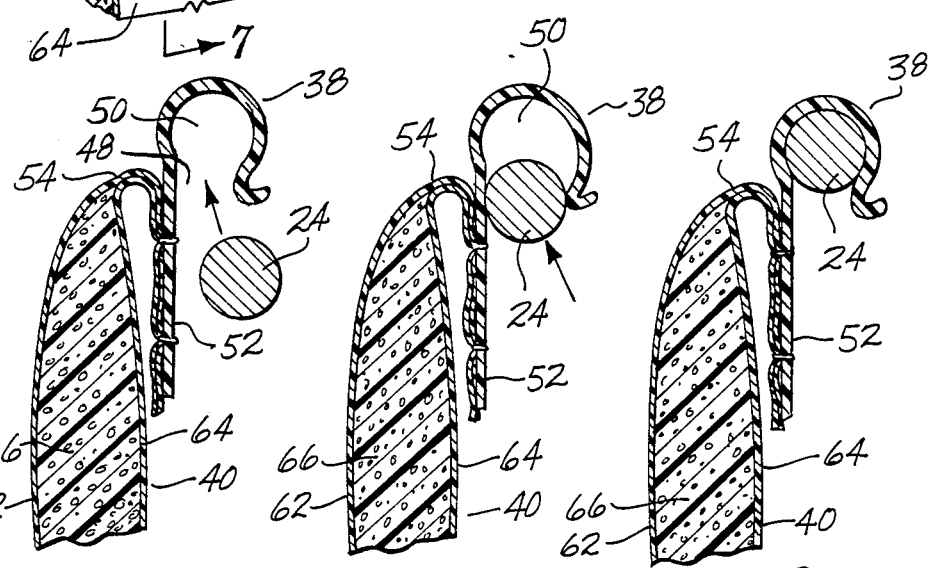
FIG. 7 is a view on yet a larger scale, taken substantially from the aspect of line 7—7 in FIG. 6.
FIG. 8 is a view like FIG. 7, but showing the hook strip in the process of engaging the forward section of the bag supporting frame.
FIG. 9 is a view like FIG. 7 and 8, but showing the hook strip positioned on the frame member.

The hook strip 38 of the illustrated embodiment includes inner 42 and outer 44 wall portions connected by an intermediate bight portion 46. In preferred form, the hook strip 38 is a continuous piece of molded thermoplastic material, such as nylon or similar material. It is beneficial if the hook strip 38 is formed of a material having an inherent resiliency or spring energy. As illustrated in FIGS. 6–9, it is preferred that the opening 48 of the hook channel is dimensioned to be less than the size of the support frame 24. The throat 50 of the hook channel is dimensioned to accommodate the support frame 24. In this manner, as shown in FIG. 8, the hook strip 38 may be sprung open to insert the support frame 24 into the hook channel. Once insertion is complete, as shown in FIG. 9, the hook strip 38 provides a firm grip on the support frame 24. The hook strip 38 may also take on other forms without departing from the spirit and scope of the invention.

Also in preferred form, the hook strip includes a securement wall portion 52 extending from the inner wall portion 42 by which the hook strip 38 may be attached to the forward wall portion 40 of the bag body 30. As shown in FIG. 4, the securement wall portion 52 may be slightly tapered in thickness to provide relative flexibility and ease of sewing the hook strip 38 to the bag body 30. It is also preferred that the upper end of the forward wall portion 40 of the bag be folded to present a top fold 54 and a front section 56 extending downwardly from the top fold outwardly of the forward wall portion 40. The front section 56 may be sewn or otherwise attached to the securement portion 52 of the hook strip 38. In this manner, a smooth, rolled edge is presented around the interior of the top of the bag body 30 to eliminate the chance of fruit being damaged by contact with raw or jagged edges.

The rear wall section 36 of the bag body 30 may be secured to a support frame 20 by a flap 58. This feature is shown in detail in FIGS. 5, 11, and 12. The flap 58 is positioned to be swung over the rear section 22 of the support frame 20 when the brace portion 26 is inserted in the pocket 34. Preferably, the flap is positioned to be swung forwardly from a rear, exterior side of the bag toward the interior side of the bag. In this manner, the flap 58 will not catch on the worker's belt buckle or be otherwise uncomfortable to the worker. The flap 58 is secured to the rear wall portion 36 by snaps 60 or other equivalent fastener means, such as hooks, buttons, adhesive, or VELCRO®-type fastening devices.

According to another aspect of the invention, the sidewalls of the bag body 30 are padded. In preferred form, this padding is open or closed cell foam rubber, or may also be a heavyweight air bubble or a "blister" packing material, similar to that used for packing delicate objects for shipment. Any suitable material which is lightweight, resilient and decay-resistant may be used as a padding material. It is preferred that the padding 66 be situated to protect fruit placed inside the bag from contact with the support frame 20. In particular, this includes providing the padding 66 layer on the interior side of the pocket 34 into which the brace portion 26 is inserted, as shown in FIG. 5. Additionally, the flap 58 may be padded to protect fruit from contact with the rear section 22 of the frame 20. If considered necessary, the snaps 60 or other fastener means for the flap 58 may also be shielded by padding.

Preferably, the bag body 30 is formed of inner and outer fabric layers 62, 64 with the padding material 66 sandwiched therebetween. These inner and outer fabric portions 62, 64 may be made of any suitable durable material. It is preferred that one or both layers be made of a waterproof material so that neither the padding 66 nor the worker 12 becomes wet from dew-soaked fruit placed in the bag. Suitable materials include vinyl, polyester, polyethylene, nylon, or a combination thereof, in either woven, nonwoven, or coated fabric forms. More traditional bag materials, such as cotton canvas, may be used as well.

Typically, fruit-picking bags are made with an open bottom which may be folded upwardly to hold the picked fruit, and then released to allow the fruit to roll out of the bag through the open bottom. The bottom of the bag is held in the upwardly folded position by cords 68, 70 attached at lower ends 72, 74 to opposite sides of the lower edge of the bag and secured at their upper ends 76, 78 at the top of the bag within convenient reach of the worker 12. Typically, the cords 68, 70 have knotted upper ends 76, 78 and are dropped into the throat of hooks 80, 82 which are supported by the support frame 20. This method of securement provides greater ease of use and construction economy over the use of a conventional snap-hook. Previously, the above-described line hooks 80, 82 could not be attached directly to the support frame 20 because of the difficulty created in attempting to sew the bag body 30 to the support frame 20 with line hooks 80, 82 in place. Instead, line hooks were attached after the bag body was sewn to a frame by bending the stem of the hook over the upper edge of the bag which had previously been sewn to the support frame. This type of attachment allowed some pivotal movement of the hooks which would occasionally require the worker 12 to grope to find the hook or allow accidental release of the support cords 68, 70.

According to an aspect of this invention, the line hooks 80, 82 may be secured directly to the support frame 20, preferably by welding, which provides a rigid and positive placement of the hooks 80, 82. Each hook includes a stem portion 83 connected to the forward section 24 of the top hoop and which then extends downwardly. The hook 80, 82 then bends 85 and extends upwardly 87 to form an upwardly opening hook throat 89. In this manner, attachment of the line hooks 80, 82 to the forward section 24 of the support frame 20 does not interfere with the attachment of the bag body 30 to the support frame 20. The stem of each line hook 80, 82 extends downwardly through the opening 48 of the hook strip 38, as shown in FIG. 14.

Figure 10:
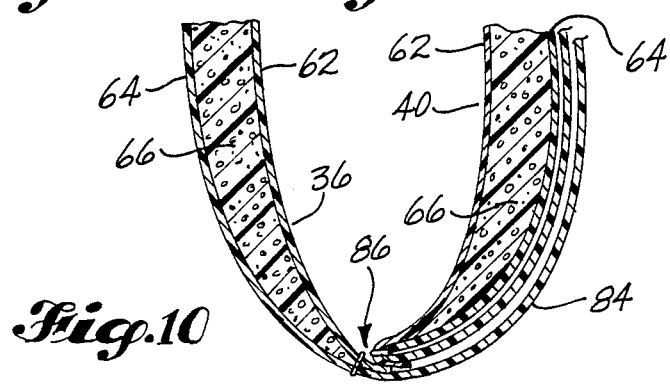
FIG. 10 is a fragmentary cross-sectional view of the bag's fold line taken substantially along line 10—10 of FIG. 2.

According to yet another aspect of the invention, a lower tail portion 84 of the bag body 30 is unpadded and relatively flexible or flaccid compared to the upper padded portion 30 of the bag body. In this manner, as shown in FIG. 10, the interface between the padded forward and rear wall portions 40, 36 and the unpadded tail portion 84 acts to create a folding hinge line 86 which provides a more secure closure of the lower end of the bag. Because the tail portion 84 remains in an upwardly folded position as fruit is carried in the bag, it is unnecessary that the tail portion 84 be padded and, therefore, the unnecessary bulk of padding 66 may be eliminated in the tail portion 84. The relative difference in stiffness between the portions 30, 84 causes the material to "hinge" at the fold line 86.

According to still another aspect of the invention, as particularly shown in FIGS. 11-13, each strap eye may include a top member 88 which slopes downwardly from an outer end 90 toward an inner end 92. This may be achieved by providing an outer leg portion 94 which is longer than an inner leg portion 96. Each leg portion 94, 96 is attached to the support frame 20 at an end of the rear section 22 of the top hoop, preferably by welding 29. The inwardly sloped top members 88 direct the harness straps 14 in an upwardly converging direction. This conforms with the natural angle of the harness when in use on a worker 12. In this manner, the harness straps 14 will wear evenly and will not be cut by rubbing against one edge of a strap eye.

It is to be understood that the above-described preferred embodiment is exemplary only and, therefore, nonlimitive. Various changes may be made to the illustrated and described embodiments without departing from the invention's spirit and scope. Any patent protection due the inventor is not to be determined by the above embodiments, but is to be determined only by a proper interpretation of the following claim or claims, wherein such interpretation is to be made in accordance with the well-established doctrines of patent claim interpretation, including the doctrine of equivalents.

What is claimed is:

1. A fruit picker's bag, comprising:
    a support frame having a top hoop including a rear section with opposite ends, a strap eye at each of said ends, a forward section extending from one end of the rear section over to the opposite end which with said rear section defines a hoop opening, and a brace portion extending generally vertically downwardly from said rear section;
    a fruit receiving bag having upper and lower ends, a rear wall portion including a pocket at the upper end of the bag for receiving the brace portion of the support frame, a forward wall portion, and a hook strip connected to the forward wall portion at the upper end of the bag, said hook strip including a downwardly opening hook channel which is detachably hookable onto the forward section of the top hoop for easy removal and re-attachment of said bag to said frame; and
    a carrying harness including a strap which extends through each of said strap eyes, said carrying harness serving to support the fruit picker's bag on a person with the top hoop of the support frame in a substantially horizontal plane and the brace portion of the support frame against a midsection of the person.

2. A fruit picker's bag according to claim 1, comprising a pair of spaced apart line hooks at side locations integral with said top hoop, each said line hook having a stem portion rigidly connected to the forward section of the top hoop, and then extending downwardly, and then bending and extending upwardly to form an upwardly opening hook throat; and
    said bag having an open lower end and a pair of lines connected to said lower end at locations such that the lower portions of the bag can be folded upwardly to close the lower end of the bag and the lines then hooked onto said line hooks to hold said lower end closed.

3. A fruit picker's bag according to claim 1, wherein said downwardly opening hook channel is defined by inner and outer wall portions connected by a bight portion, and wherein said forward wall portion of said bag is connected to said inner wall portion of said hook strip such that said downwardly opening hook channel extends outwardly from said bag and over said forward section of the top hoop.

4. A fruit picker's bag according to claim 1, wherein the rear wall portion of the bag includes a flap positioned to be swung over the rear section of the top hoop when the brace portion of the support frame is within said pocket, and connector means for detachably connecting the flap to close the pocket and thereby detachably connect the rear wall portion of the bag to the support frame.

5. A fruit picker's bad according to claim 4, wherein said flap is positioned to be forwardly swung over the rear section of the top hoop and detachably connectable to an interior side of said rear wall portion.

6. A fruit picker's bag according to claim 1, wherein said brace portion of the support frame comprises a pair of vertical side members having upper ends connected to the rear section of the top hoop adjacent the strap eyes, and lower ends, and a horizontal frame member interconnecting said lower ends.

7. A fruit picker's bag according to claim 6, wherein the rear wall portion of the bag includes a flap positioned to be swung over the rear section of the top hoop when the brace portion of the support frame is within said pocket, and connector means for detachably connecting the flap to close the pocket and thereby detachably connect the rear wall portion of the bag to the support frame.

8. A fruit picker's bag according to claim 1, wherein said rear and forward wall portions, substantially from said upper end to said lower end of the fruit receiving bag, are padded.

9. A fruit picker's bag according to claim 8, wherein said padded wall portions are relatively stiffened and said bag further includes a relatively flaccid unpadded tail portion at said lower end such that the tail portion of the bag may be folded upwardly to close the lower end of the bag, said fold occurring substantially at a hinging intersection between said padded wall portions and said unpadded tail portion.

10. A fruit picker's bag, comprising:
a support frame having a top hoop including a rear section with opposite ends, a strap eye at each of said ends, a forward section extending from one end of the rear section over to the opposite end which with said rear section defines a hoop opening, and a brace portion extending generally vertically downwardly from said rear section;
a fruit receiving bag having upper and lower ends, a rear wall portion including a pocket at the upper end of the bag for receiving the brace portion of the support frame, a forward wall portion, and a hook strip connected to the forward wall portion at the upper end of the bag, said hook strip including a downwardly opening hook channel which is hookable onto the forward section of the top hoop; and
a carrying harness including a strap which extends through each of said strap eyes, said carrying harness serving to support the fruit picker's bag on a person with the top hoop of the support frame in a substantially horizontal plane and the brace portion of the support frame against a midsection of the person;
wherein said brace portion of the support frame comprises a pair of vertical side members having upper ends connected to the rear section of the top hoop adjacent the strap eyes, and lower ends, and a horizontal frame member interconnecting said lower ends;
wherein said hook strip extends from a position outwardly adjacent one of said strap eyes around said forward section to a position outwardly adjacent the other strap eye.

11. A fruit picker's bag according to claim 10, wherein the rear wall portion of the bag includes a flap positioned to be swung over the rear section of the top hoop when the brace portion of the support frame is within said pocket, and connector means for connecting the flap to the rear wall portion of the bag.

12. A fruit picker's bag, comprising:
a support frame having a top hoop including a rear section with opposite ends, a strap eye at each of said ends, a forward section extending from one end of the rear section over to the opposite end which with said rear section defines a hoop opening, and a brace portion extending generally vertically downwardly from said rear section;
a fruit receiving bag having upper and lower ends, a rear wall portion including a pocket at the upper end of the bag for receiving the brace portion of the support frame, a forward wall portion, and a hook strip connected to the forward wall portion at the upper end of the bag, said hook strip including a downwardly opening hook channel which is hookable onto the forward section of the top hoop; and
a carrying harness including a strap which extends through each of said strap eyes, said carrying harness serving to support the fruit picker's bag on a person with the top hoop of the support frame in a substantially horizontal plane and the brace portion of the support frame against a midsection of the person;
wherein said hook strip includes a securement wall portion, an opposing wall portion, and a bight portion extending therebetween, wherein the forward wall portion of the bag at the upper end of the bag is folded to present a top fold and a front section extending downwardly from the top fold outwardly of an adjoining section of the forward wall portion, said front section being in juxtaposition with the securement wall portion of the hook strip and being connected to said securement wall portion of the hook strip.

13. A fruit picker's bag according to claim 12, wherein said securement wall portion of the hook strip is positioned inwardly of said forward section of the top hoop and said bight portion extends outwardly over said top hoop to said opposing wall portion.

14. A fruit picker's bag according to claim 12, wherein said rear and forward wall portions of the fruit receiving bag are padded.

15. A fruit picker's bag according to claim 14, wherein said padded wall portions are substantially stiffened and said bag further includes a relatively flaccid unpadded tail portion with an open lower end such that the tail portion of the bag may be folded upwardly to close the lower end of the bag, said fold occurring substantially at a hinging intersection between said padded wall portions and said unpadded tail portion.

16. A fruit picker's bag, comprising:
- a support frame having a top hoop including a rear section with opposite ends, a strap eye at each of said ends, a forward section extending from one end of the rear section over to the opposite end which with said rear section defines a hoop opening, and a brace portion extending generally vertically downwardly from said rear section;
- a fruit receiving bag having upper and lower ends, a rear wall portion including a pocket at the upper end of the bag for receiving the brace portion of the support frame, a forward wall portion, and a hook strip connected to the forward wall portion at the upper end of the bag, said hook strip including a downwardly opening hook channel which is hookable onto the forward section of the top hoop; and
- a carrying harness including a strap which extends through each of said strap eyes, said carrying harness serving to support the fruit picker's bag on a person with the top hoop of the support frame in a substantially horizontal plane and the brace portion of the support frame against a midsection of the person;
- wherein each strap eye includes a top member which slopes downwardly from an outer end to an inner end, an wherein said harness includes straps in contact with said top members which extend upwardly from the strap eyes, and which owing to the slope of the top member, converge as they extend upwardly.

17. A fruit picker's bag according to claim 16, comprising a pair of spaced apart line hooks at side locations on said top hoop, each said line hook having a stem portion connected to the forward section of the top hoop, and then extending downwardly, and then bending and extending upwardly to form an upwardly opening hook throat; and
- said bag having an open lower end and a pair of lines connected to said lower end at locations such that the lower portion of the bag can be folded upwardly to close the lower end of the bag and the lines then hooked onto said line hooks to hold said lower end closed.

18. A fruit picker's bag, comprising: a support frame having a top hoop including a rear section with opposite ends, a strap eye at each of said ends, a forward section extending from one end of the rear section over to the opposite end which with said rear section defines a hoop opening, and a brace portion extending generally vertically downwardly from said rear section;
- a fruit-receiving bag having upper and lower open ends, said bag being attached at said upper end to said support frame, said bag having padded body sidewalls which are relatively stiff and a lower unpadded tail portion adjacent said lower open end which is relatively flaccid, said tail portion being foldable upwardly to close the lower ends of the bag, a hinging fold line occurring between said padded body and said tail portion of the bag.

19. A fruit picker's bag according to claim 18, wherein said upper end of said fruit-receiving bag is detachably connected to said support frame for easy removal and re-attachment.

* * * * *

UNITED STATES PATENT AND TRADEMARK OFFICE
CERTIFICATE OF CORRECTION

PATENT NO. : 4,925,071
DATED : May 15, 1990
INVENTOR(S) : Jerry A. Fleming et al.

It is certified that error appears in the above-identified patent and that said Letters Patent is hereby corrected as shown below:

In claim 18, column 10, line 14, "a support frame" starts a separate paragraph; and in line 27, "ends" should be -- end --.

Signed and Sealed this

Twenty-eighth Day of May, 1991

Attest:

HARRY F. MANBECK, JR.

*Attesting Officer*   *Commissioner of Patents and Trademarks*